(12) United States Patent
Liu

(10) Patent No.: US 9,567,436 B2
(45) Date of Patent: Feb. 14, 2017

(54) SUPER HIGH SELECTIVITY AROMATIC BLOCK COPOLYIMIDE MEMBRANES FOR SEPARATIONS

(71) Applicant: UOP LLC, Des Plaines, IL (US)

(72) Inventor: Chunqing Liu, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/574,319

(22) Filed: Dec. 17, 2014

(65) Prior Publication Data

US 2016/0177035 A1 Jun. 23, 2016

(51) Int. Cl.
| | |
|---|---|
| C08L 79/08 | (2006.01) |
| C08G 73/10 | (2006.01) |
| B01D 53/22 | (2006.01) |
| B01D 69/08 | (2006.01) |
| B01D 71/64 | (2006.01) |
| B01D 71/76 | (2006.01) |
| C08L 77/00 | (2006.01) |

(52) U.S. Cl.
CPC ......... C08G 73/1067 (2013.01); B01D 53/228 (2013.01); B01D 69/08 (2013.01); B01D 69/088 (2013.01); B01D 71/64 (2013.01); B01D 71/76 (2013.01); C08G 73/1032 (2013.01); C08G 73/1039 (2013.01); C08G 73/1042 (2013.01); C08L 79/08 (2013.01); *B01D 2053/224* (2013.01); *C08L 77/00* (2013.01)

(58) Field of Classification Search
CPC ..... C08G 73/1042; B01D 71/64; C08L 77/00; C08L 79/08
See application file for complete search history.

(56) References Cited

U.S. PATENT DOCUMENTS

| | | | |
|---|---|---|---|
| 2005/0268783 A1 | 12/2005 | Koros et al. | |
| 2009/0178561 A1 | 7/2009 | Miller et al. | |
| 2009/0182097 A1 | 7/2009 | Miller et al. | |
| 2011/0130611 A1* | 6/2011 | Gonzalez | B01D 53/228 585/818 |
| 2013/0047844 A1* | 2/2013 | Zheng | B01D 67/003 95/45 |

OTHER PUBLICATIONS

Chen et al Plasticization-resistant hollow fiber membranes for C02/CH4 separation based on a thermally crosslinkable polyimide Journal of Membrane Science, 382 (2011), 212-221, Jan. 2011.*
Chen, "Plasticization-resistant hollow fiber membranes for CO2/CH4 separation based on a thermally crosslinkable polyimide", Journal of Membrane Science 382 (2011) 212-221.
Liu, "Chemical cross-linking modification of polyimide membranes for gas separation", Journal of Membrane Science 189 (2001) 231-239.
Qiu, "Sub-Tg Cross-Linking of a Polyimide Membrane for Enhanced CO2 Plasticization Resistance for Natural Gas Separation", Macromolecules 2011, 44, 6046-6056.
U.S. Appl. No. 14/039,477, filed Sep. 27, 2013.

* cited by examiner

*Primary Examiner* — Gregory Listvoyb

(57) ABSTRACT

This invention relates to aromatic block copolyimide polymers comprising both hydroxyl functional groups and carboxylic acid functional groups, their membranes and methods for making and using these polymers and membranes. The aromatic block copolyimide polymer described in the present invention comprises both hydroxyl functional groups and carboxylic acid functional groups. The gas transport properties particularly the selectivities of the aromatic block copolyimide comprising both hydroxyl functional groups and carboxylic acid functional groups were significantly improved compared to those of the aromatic random copolyimide comprising both hydroxyl functional groups and carboxylic acid functional groups.

13 Claims, No Drawings

US 9,567,436 B2

SUPER HIGH SELECTIVITY AROMATIC BLOCK COPOLYIMIDE MEMBRANES FOR SEPARATIONS

BACKGROUND OF THE INVENTION

This invention relates to high selectivity aromatic block copolyimide membranes comprising both hydroxyl functional groups and carboxylic acid functional groups and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes that have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or extraordinarily large membrane surface areas are required to allow separation of large amounts of material. Permeance, measured in Gas Permeation Units (GPU, 1 GPU=$10^{-6}$ $cm^3$ (STP)/$cm^2$ s (cm Hg)), is the pressure normalized flux and equals to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin". However, fabrication of defect-free high selectivity asymmetric integrally skinned polyimide membranes is difficult. The presence of nanopores or defects in the skin layer reduces the membrane selectivity. The high shrinkage of the polyimide membrane on cloth substrate during membrane casting and drying process results in unsuccessful fabrication of asymmetric integrally skinned polyimide membranes using phase inversion technique.

US 2005/0268783 A1, US 2009/0182097 A1, and US 2009/0178561 A1 disclosed chemically cross-linked polyimide hollow fiber membranes prepared from two separate steps. Step one is the synthesis of a monoesterified polyimide polymer in a solution by treating a polyimide polymer containing carboxylic acid functional group with a small diol molecule at esterification conditions in the presence of dehydrating conditions. However, a significant extra amount of diol was used to prevent the formation of biesterified polyimide polymer. Step two is the solid state transesterification of the monoesterified polyimide membrane at elevated temperature to form a cross-linked polyimide membrane.

Chemical cross-linking of polyimides using diamine small molecules has also been disclosed. (J. MEMBR. SCI., 2001, 189, 231-239). However, $CO_2$ permeability decreased significantly after this type of cross-linking. In addition, the thermal stability and hydrolytic stability of the diamine cross-linked polyimide were not improved.

Koros et al. disclosed decarboxylation-induced thermally cross-linked polyimide membrane. (J. MEMBR. SCI., 2011, 382, 212-221 and MACROMOLECULES, 2011, 44, 6046) However, decarboxylation reaction among the carboxylic acid groups on the carboxylic acid group-containing polyimide membrane occurred at temperatures higher than the glass transition temperature of the polyimide polymer. Such a high temperature resulted in densification of the substructure of the membrane and decreased membrane permeance. In addition, the 6FDA-DAM:DABA polyimide reported by Koros is a random copolyimide that was synthesized by reacting all the monomers together.

Liu et al. (U.S. application Ser. No. 14/039,477) disclosed a new type of self-cross-linkable aromatic polyimide membrane prepared from a self-cross-linkable aromatic polyimide polymer that comprises both hydroxyl functional groups and carboxylic acid functional groups. The aromatic polyimide comprising both hydroxyl functional groups and carboxylic acid functional groups is a random copolyimide synthesized by reacting two different diamine monomers simultaneously with a dianhydride monomer.

The present invention discloses high selectivity aromatic block copolyimide membranes comprising both hydroxyl functional groups and carboxylic acid functional groups and methods for making and using these membranes.

SUMMARY OF THE INVENTION

The present invention discloses high selectivity aromatic block copolyimide membranes comprising both hydroxyl functional groups and carboxylic acid functional groups and methods for making and using these membranes. The block polymer chain structure of the aromatic block copolyimide comprising both hydroxyl functional groups and carboxylic acid functional groups is different from that of the aromatic random copolyimide comprising both hydroxyl functional groups and carboxylic acid functional groups as disclosed by Liu et al. (U.S. application Ser. No. 14/039,477). The gas transport properties particularly the selectivities of the aromatic block copolyimide comprising both hydroxyl functional groups and carboxylic acid functional groups were significantly improved compared to those of the aromatic random copolyimide comprising both hydroxyl functional groups and carboxylic acid functional groups as disclosed by Liu et al. (U.S. application Ser. No. 14/039,477) mainly due to the formation of block polymer chain structure. The aromatic block copolyimide comprising both hydroxyl functional groups and carboxylic acid functional groups disclosed in the current invention has better packing of the polymer chains and forms more hydrogen bonds between the hydroxyl functional groups and the carboxylic acid functional groups or more hydrogen bonds between the carboxylic acid functional groups than the aromatic random copolyimide comprising both hydroxyl functional groups and carboxylic acid functional groups.

An embodiment of the present invention is for an aromatic block copolyimide comprising both hydroxyl functional groups and carboxylic acid functional groups and aromatic block copolyimide membranes made from this polymer. The aromatic block copolyimide polymer described in the present invention comprises both hydroxyl functional groups and carboxylic acid functional groups. The aromatic block copolyimide polymer comprises multiple blocks of Ia and multiple blocks of Ib, wherein block Ia and block Ib are covalently bound to each other, wherein block Ia and block Ib are represented by:

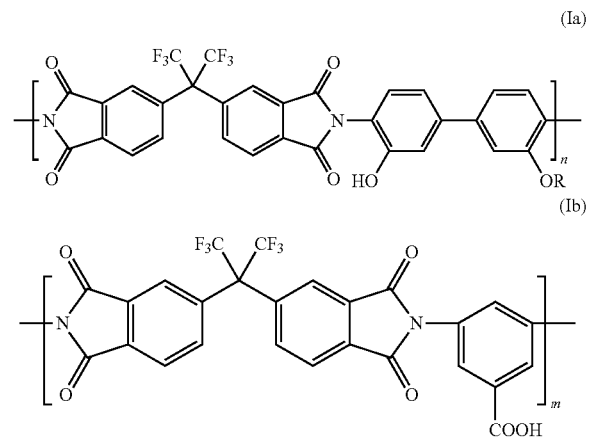

wherein said block Ia constitutes about 1-99 mol % of a total of the blocks Ia and blocks Ib; wherein —R is selected from the group consisting of —H, COCH$_3$, and mixtures thereof; n and m are independent integers from 10 to 500. Preferably block Ia constitutes about 50-90 mol % of a total of the blocks Ia and blocks Ib.

The aromatic block copolyimide comprising both hydroxyl functional groups and carboxylic acid functional groups described in the current invention is poly[2,2'-bis-(3,4-dicarboxyphenyl) hexafluoropropane dianhydride-3,3'-dihydroxy-4,4'-diamino-biphenyl]-block-poly[2,2'-bis-(3,4-dicarboxyphenyl) hexafluoropropane dianhydride-3,5-diaminobenzoic acid].

The invention further comprises a method for preparing an aromatic block polyimide polymer comprising both hydroxyl functional groups and carboxylic acid functional groups. The method comprises three steps including: a) a polycondensation reaction of 2,2'-bis-(3,4-dicarboxyphenyl) hexafluoropropane dianhydride (6FDA) with 3,5-diaminobenzoic acid (DBA) in a polar solvent such as dimethylacetamide (DMAc) or (NMP) solvent at room temperature to form 6FDA-DBA-based poly(amic acid); b) adding 3,3'-dihydroxy-4,4'-diamino-biphenyl (HAB) monomer to 6FDA-DBA-based poly(amic acid) solution followed by the addition of 6FDA monomer to the solution dropwise to form 6FDA-DBA-based poly(amic acid)-block-6FDA-HAB-based poly(amic acid) solution; c) a solution chemical imidization of 6FDA-DBA-based poly(amic acid)-block-6FDA-HAB-based poly(amic acid) in the presence of acetic anhydride dehydrating agent and pyridine imidization catalyst to form poly(6FDA-DBA)-block-poly(6FDA-HAB) block copolyimide.

The high selectivity aromatic block copolyimide polymer comprising both hydroxyl functional groups and carboxylic acid functional groups of the invention may be fabricated into any known membrane configuration or form.

The invention also involves a process for separating at least one gas from a mixture of gases comprising providing the high selectivity aromatic block copolyimide polymer membrane comprising both hydroxyl functional groups and carboxylic acid functional groups; contacting the mixture of gases to one side of the high selectivity aromatic block copolyimide polymer membrane comprising both hydroxyl functional groups and carboxylic acid functional groups to cause at least one gas to permeate said membrane; and removing from an opposite side of said high selectivity aromatic block copolyimide polymer membrane comprising both hydroxyl functional groups and carboxylic acid functional groups a permeate gas composition comprising a portion of said at least one gas that permeated said membrane.

DETAILED DESCRIPTION OF THE INVENTION

The present invention generally relates to a new type of aromatic block copolyimide polymer comprising both hydroxyl functional groups and carboxylic acid functional groups and high selectivity aromatic block copolyimide polymer membrane made from the aromatic block copolyimide polymer comprising both hydroxyl functional groups and carboxylic acid functional groups. The present invention also relates to a method of making the high selectivity aromatic block copolyimide polymer membrane, as well as the use of the high selectivity aromatic block copolyimide polymer membrane for gas, vapor, and liquid separations.

The block polymer chain structure of the aromatic block copolyimide comprising both hydroxyl functional groups and carboxylic acid functional groups is different from that of the aromatic random copolyimide comprising both hydroxyl functional groups and carboxylic acid functional groups as disclosed by Liu et al. (U.S. application Ser. No. 14/039,477). The gas transport properties particularly the selectivities of the aromatic block copolyimide comprising both hydroxyl functional groups and carboxylic acid functional groups were significantly improved compared to those of the aromatic random copolyimide comprising both hydroxyl functional groups and carboxylic acid functional groups as disclosed by Liu et al. (U.S. application Ser. No. 14/039,477) mainly due to the formation of block polymer chain structure. The aromatic block copolyimide comprising both hydroxyl functional groups and carboxylic acid functional groups disclosed in the current invention has better packing of the polymer chains and forms more hydrogen bonds between the hydroxyl functional groups and the carboxylic acid functional groups or more hydrogen bonds between the carboxylic acid functional groups than the aromatic random copolyimide comprising both hydroxyl functional groups and carboxylic acid functional groups.

The aromatic block copolyimide polymer membrane described in the present invention showed high selectivity and good permeability for a variety of gas separation applications such as $CO_2/CH_4$, $H_2/CH_4$, and $He/CH_4$ separations. For example, an aromatic block copolyimide polymer membrane prepared from aromatic block copolyimide of poly[2,2'-bis-(3,4-dicarboxyphenyl) hexafluoropropane dianhydride-3,3'-dihydroxy-4,4'-diamino-biphenyl]-block-poly[2,2'-bis-(3,4-dicarboxyphenyl) hexafluoropropane dianhydride-3,5-diaminobenzoic acid] (abbreviated as poly(6FDA-HAB)-block-poly(6FDA-DBA)) has $CO_2$ permeability of 3.4 Barrers and high $CO_2/CH_4$ selectivity of 59.0 for $CO_2/CH_4$ separation. This poly(6FDA-HAB)-block-poly(6FDA-DBA) aromatic block copolyimide membrane has $H_2$ permeability of 20.5 Barrers and high $H_2/CH_4$ selectivity of 354.1 for $H_2/CH_4$ separation. This poly(6FDA-HAB)-block-poly(6FDA-DBA) aromatic block copolyimide membrane also has He permeability of 32.1 Barrers and high $He/CH_4$ selectivity of 554.5 for $He/CH_4$ separation.

The present invention is for an aromatic block copolyimide comprising both hydroxyl functional groups and carboxylic acid functional groups and aromatic block copolyimide membranes made from this polymer. The aromatic block copolyimide polymer described in the present invention comprises both hydroxyl functional groups and carboxylic acid functional groups. The aromatic block copolyimide polymer comprises multiple blocks of Ia and multiple blocks of Ib, wherein block Ia and block Ib are covalently bound to each other, wherein block Ia and block Ib are represented by:

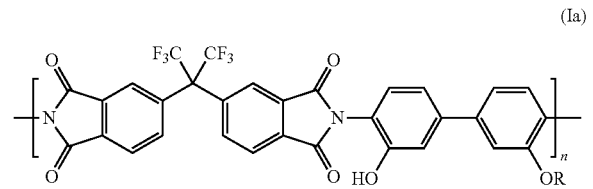

(Ia)

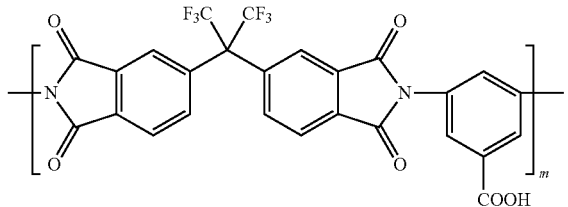

(Ib)

wherein said block Ia constitutes about 1-99 mol % of a total of the blocks Ia and blocks Ib; wherein —R is selected from the group consisting of —H, $COCH_3$, and mixtures thereof; n and m are independent integers from 10 to 500. Preferably block Ia constitutes about 50-90 mol % of a total of the blocks Ia and blocks Ib.

The aromatic block copolyimide comprising both hydroxyl functional groups and carboxylic acid functional groups described in the current invention is poly[2,2'-bis-(3,4-dicarboxyphenyl) hexafluoropropane dianhydride-3,3'-dihydroxy-4,4'-diamino-biphenyl]-block-poly[2,2'-bis-(3,4-dicarboxyphenyl) hexafluoropropane dianhydride-3,5-diaminobenzoic acid] (abbreviated as poly(6FDA-HAB)-block-poly(6FDA-DBA)).

The invention further comprises a method for preparing an aromatic block polyimide polymer comprising both hydroxyl functional groups and carboxylic acid functional groups. The method comprises three steps including: a) a polycondensation reaction of 2,2'-bis-(3,4-dicarboxyphenyl) hexafluoropropane dianhydride (6FDA) with 3,5-diaminobenzoic acid (DBA) in a polar solvent such as dimethylacetamide (DMAc) or (NMP) solvent at room temperature to form 6FDA-DBA-based poly(amic acid); b) adding 3,3'-dihydroxy-4,4'-diamino-biphenyl (HAB) monomer to 6FDA-DBA-based poly(amic acid) solution followed by the addition of 6FDA monomer to the solution dropwise to form 6FDA-DBA-based poly(amic acid)-block-6FDA-HAB-based poly(amic acid) solution; c) a solution chemical imidization of 6FDA-DBA-based poly(amic acid)-block-6FDA-HAB-based poly(amic acid) in the presence of acetic anhydride dehydrating agent and a pyridine imidization catalyst to form poly(6FDA-DBA)-block-poly(6FDA-HAB) block copolyimide.

The aromatic block polyimide polymer comprising both hydroxyl functional groups and carboxylic acid functional groups described in the present invention has a weight average molecular weight in the range of 10,000 to 1,000,000 Daltons, preferably between 70,000 to 500,000 Daltons.

The aromatic block polyimide polymer membrane made from the aromatic block polyimide polymer comprising both hydroxyl functional groups and carboxylic acid functional groups described in the present invention can be fabricated into any convenient geometry such as flat sheet (or spiral wound), tube, or hollow fiber.

The invention provides a process for separating at least one gas from a mixture of gases using the aromatic block polyimide polymer membrane described in the present invention, the process comprising: (a) providing an aromatic block polyimide polymer membrane described in the present invention which is permeable to said at least one gas; (b) contacting the mixture on one side of the aromatic block polyimide polymer membrane described in the present invention to cause said at least one gas to permeate the membrane; and (c) removing from the opposite side of the membrane a permeate gas composition comprising a portion of said at least one gas which permeated said membrane.

The aromatic block polyimide polymer membrane described in the present invention is especially useful in the purification, separation or adsorption of a particular species in the liquid or gas phase. In addition to separation of pairs of gases, the aromatic block polyimide polymer membrane described in the present invention may, for example, be used for the desalination of water by reverse osmosis or for the separation of proteins or other thermally unstable compounds, e.g. in the pharmaceutical and biotechnology industries. The aromatic block polyimide polymer membrane described in the present invention may also be used in fermenters and bioreactors to transport gases into the reaction vessel and transfer cell culture medium out of the vessel. Additionally, the aromatic block polyimide polymer membrane described in the present invention may be used for the removal of microorganisms from air or water streams, water purification, ethanol production in a continuous fermentation/membrane pervaporation system, and in detection or removal of trace compounds or metal salts in air or water streams.

The aromatic block polyimide polymer membrane described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of He, $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, xylene separations, iso/normal paraffin separations, liquid natural gas separations, $C_2$+ hydrocarbon recovery. Any given pair or group of gases that differ in molecular size, for example nitrogen and oxygen, carbon dioxide and methane, hydrogen and methane or carbon monoxide, helium and methane, can be separated using the aromatic block polyimide polymer membrane described in the present invention. More than two gases can be removed from a third gas. For example, some of the gas components which can be selectively removed from a raw natural gas using the aromatic block polyimide polymer membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the aromatic block polyimide polymer membrane of the present invention will range from about −20° to about 100° C., and most preferably, the effective operating temperature of the membranes of the present invention will range from about 25° to about 100° C.

The aromatic block polyimide polymer membrane described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which the aromatic block polyimide polymer membrane described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The aromatic block polyimide polymer membrane described in the present invention may incorporate a species that adsorbs strongly to certain gases (e.g. cobalt porphyrins or phthalocyanines for $O_2$ or silver (I) for ethane) to facilitate their transport across the membrane.

The aromatic block polyimide polymer membrane described in the present invention also has immediate application to concentrate olefin in a paraffin/olefin stream for olefin cracking application. For example, the aromatic block polyimide polymer membrane described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the aromatic block polyimide polymer membrane described in the present invention is for separating isoparaffin and normal paraffin in light paraffin isomerization and MaxEne™, a process from UOP LLC, Des Plaines, Ill., for enhancing the concentration of normal paraffin (n-paraffin) in the naphtha cracker feedstock, which can be then converted to ethylene.

The aromatic block polyimide polymer membrane described in the present invention can also be operated at high temperature to provide the sufficient dew point margin for natural gas upgrading (e.g, $CO_2$ removal from natural gas). The aromatic block polyimide polymer membrane described in the present invention can be used in either a single stage membrane or as the first or/and second stage membrane in a two stage membrane system for natural gas upgrading.

The aromatic block polyimide polymer membrane described in the present invention may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using the aromatic block polyimide polymer membrane described in the present invention is the deep desulfurization of gasoline and diesel fuels by a pervaporation membrane process similar to the process described in U.S. Pat. No. 7,048,846, incorporated by reference herein in its entirety. The aromatic block polyimide polymer membrane described in the present invention that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the aromatic block polyimide polymer membrane described in the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

EXAMPLES

The following examples are provided to illustrate one or more preferred embodiments of the invention, but are not limited embodiments thereof. Numerous variations can be made to the following examples that lie within the scope of the invention.

Example 1

Synthesis of Aromatic Block Copolyimide poly[2, 2'-bis-(3,4-dicarboxyphenyl) hexafluoropropane dianhydride-3,3'-dihydroxy-4,4'-diamino-biphenyl]-block-poly[2,2'-bis-(3,4-dicarboxyphenyl) hexafluoropropane dianhydride-3,5-diaminobenzoic acid] (Abbreviated as Poly(6FDA-HAB)-Block-Poly (6FDA-DBA))

Poly(6FDA-HAB)-block-poly(6FDA-DBA) block copolyimide was synthesized from a three-step polycondensation reaction. A 1 L three-neck round-bottom flask equipped with a nitrogen inlet and a mechanical stirrer was charged with 4.56 g (0.03 mol) of DBA and 25 g of DMAc. Once DBA was fully dissolved, 13.5 g of 6FDA (0.0303 mol) was added to the DBA solution in the flask. Then 95 g of DMAc was added to the solution. The reaction mixture was mechanically stirred for 8 hours at ambient temperature to give a viscous 6FDA-DBA-based poly(amic acid) solution. Then 25.9 g (0.12 mol) of HAB and 50 g of DMAc were added to the 6FDA-DBA-based poly(amic acid) solution. 53.7 g of 6FDA (0.0303 mol) was added to the solution slowly. Then 380 g of DMAc was added to the solution. The reaction mixture was mechanically stirred for another 16 hours at ambient temperature. Then another 70 g of DMAc solvent, 32.1 g (0.315 mol) of acetic anhydride and 49.8 g (0.63 mol) of pyridine were added to the reaction mixture under stirring. The reaction mixture was mechanically stirred for an additional 3 hour at 95° C. to yield poly(6FDA-HAB)-block-poly(6FDA-DBA) block copolyimide. The poly (6FDA-HAB)-block-poly(6FDA-DBA) block copolyimide product was recovered by adding methanol and water to the reaction mixture under mechanical stirring. The resultant poly(6FDA-HAB)-block-poly(6FDA-DBA) block copolyimide was then thoroughly rinsed with methanol and dried in a vacuum oven at 120° C. for 48 hours.

Comparative Example 1

Synthesis of Aromatic Random Copolyimide poly [2,2'-bis-(3,4-dicarboxyphenyl) hexafluoropropane dianhydride-3,5-diaminobenzoic acid-3,3'-dihydroxy-4,4'-diamino-biphenyl] (Abbreviated as Poly (6FDA-HAB-DBA))

Poly(6FDA-HAB-DBA) random copolyimide was synthesized from polycondensation reaction of 2,2'-bis-(3,4-dicarboxyphenyl) hexafluoropropane dianhydride (6FDA) with a mixture of 3,5-diaminobenzoic acid (DBA) and 3,3'-dihydroxy-4,4'-diamino-biphenyl (HAB) in DMAc polar solvent by a two-step process. A 1 L three-neck round-bottom flask equipped with a nitrogen inlet and a mechanical stirrer was charged with 25.9 g (0.12 mol) of HAB, 4.56 g (0.03 mol) of DBA and 121.8 g of DMAc. Once HAB and DBA were fully dissolved, 66.6 g of 6FDA (0.15 mol) was added to the HAB and DBA solution in the flask. Then 428 g of DMAc was added to the solution. The reaction mixture was mechanically stirred for 24 hours at ambient temperature to give a viscous 6FDA-HAB-DBA random poly(amic acid) solution. Then 32.1 g (0.315 mol) of acetic anhydride and 49.8 g (0.63 mol) of pyridine were added to the reaction mixture under stirring. The reaction mixture was mechanically stirred for an additional 3 hour at 95° C. to yield the random copolyimide poly(6FDA-HAB-DBA). The poly(6FDA-HAB-DBA) random copolyimide product in a power form was recovered by adding methanol to the reaction mixture under mechanical stirring. The resultant poly(6FDA-HAB-DBA) random copolyimide was then thoroughly rinsed with methanol and dried in a vacuum oven at 120° C. for 48 hours.

Example 2

Preparation and Evaluation of Poly(6FDA-HAB-DBA) Random Copolyimide and Poly(6FDA-HAB)-Block-Poly(6FDA-DBA) Block Copolyimide Dense Film Membranes from Poly(6FDA-HAB-DBA) Random Copolyimide and Poly(6FDA-HAB)-Block-Poly(6FDA-DBA) Block Copolyimide, Respectively 5.0 g of poly(6FDA-HAB-DBA) random copolyimide synthesized in Comparative Example 1 was dissolved in 20.0 g of NMP solvent. The mixture was mechanically stirred for 2 hours to form a homogeneous casting dope. The resulting homogeneous casting dope was allowed to degas overnight. The poly(6FDA-HAB-DBA) random copolyimide dense film membrane was prepared from the bubble free casting dope on a clean glass plate using a doctor knife with a 15-mil gap. The membrane together with the glass plate was then put into a vacuum oven. The solvents were removed by slowly increasing the vacuum and the temperature of the vacuum oven. Finally, the membrane was heated at 200° C. under vacuum for 48 hours to completely remove the residual solvents and form dried poly(6FDA-HAB-DBA) random copolyimide dense film membrane.

The poly(6FDA-HAB)-block-poly(6FDA-DBA) block copolyimide dense film membrane was prepared from the poly(6FDA-HAB)-block-poly(6FDA-DBA) block copolyimide synthesized in Example 1 using a procedure similar to that for poly(6FDA-HAB-DBA) random copolyimide dense film membrane.

The poly(6FDA-HAB-DBA) random copolyimide dense film membrane and the poly(6FDA-HAB)-block-poly (6FDA-DBA) block copolyimide dense film membrane were tested for $CO_2/CH_4$, $H_2/CH_4$, and $He/CH_4$ separations at 50° C. under 791 kPa (100 psig) pure single feed gas pressure. The results in Tables 1, 2 and 3 showed that the poly(6FDA-HAB)-block-poly(6FDA-DBA) block copolyimide dense film membrane had $CO_2$ permeability of 3.4 Barrers and high $CO_2/CH_4$ selectivity of 59.0 for $CO_2/CH_4$ separation (Table 1). This poly(6FDA-HAB)-block-poly (6FDA-DBA)block copolyimide dense film membrane has $H_2$ permeability of 20.5 Barrers and high $H_2/CH_4$ selectivity of 354.1 for $H_2/CH_4$ separation (Table 2). This poly(6FDA-HAB)-block-poly(6FDA-DBA)block copolyimide dense film membrane also has He permeability of 32.1 Barrers and high $He/CH_4$ selectivity of 554.5 for $He/CH_4$ separation (Table 3). The poly(6FDA-HAB)-block-poly(6FDA-DBA) block copolyimide dense film membrane showed significantly improved $CO_2/CH_4$ and $H_2/CH_4$ selectivities compared to the poly(6FDA-HAB-DBA) random copolyimide dense film membrane.

TABLE 1

Pure gas permeation test results of poly(6FDA-HAB-DBA) random copolyimide dense film membrane and poly(6FDA-HAB)-block-poly(6FDA-DBA) block copolyimide dense film membrane for $CO_2/CH_4$ separation [a]

| Dense Film Membrane | $P_{CO2}$ (Barrer) | $\alpha_{CO2/CH4}$ |
| --- | --- | --- |
| Poly(6FDA-HAB-DBA) | 5.13 | 49.3 |
| Poly(6FDA-HAB)-block-poly(6FDA-DBA) | 3.41 | 59.0 |

[a] $P_{CO2}$ and $P_{CH4}$ were tested at 50° C. and 690 kPa (100 psig); 1 Barrer = $10^{-10}$ $cm^3$(STP) · $cm/cm^2$ · sec · cmHg.

TABLE 2

Pure gas permeation test results of poly(6FDA-HAB-DBA) random copolyimide dense film membrane and poly(6FDA-HAB)-block-poly(6FDA-DBA) block copolyimide dense film membrane for $H_2/CH_4$ Separation [a]

| Dense Film Membrane | $P_{H2}$ (Barrer) | $\alpha_{H2/CH4}$ |
| --- | --- | --- |
| Poly(6FDA-HAB-DBA) | 22.9 | 220.1 |
| Poly(6FDA-HAB)-block-poly(6FDA-DBA) | 20.5 | 354.1 |

[a] $P_{H2}$ and $P_{CH4}$ were tested at 50° C. and 690 kPa (100 psig); 1 Barrer = $10^{-10}$ $cm^3$(STP) · $cm/cm^2$ · sec · cmHg.

TABLE 3

Pure gas permeation test results of poly(6FDA-HAB)-block-poly(6FDA-DBA) block copolyimide dense film membrane for $He/CH_4$ Separation [a]

| Dense Film Membrane | $P_{He}$ (Barrer) | $\alpha_{He/CH4}$ |
| --- | --- | --- |
| Poly(6FDA-HAB)-block-poly(6FDA-DBA) | 32.1 | 554.5 |

[a] $P_{He}$ and $P_{CH4}$ were tested at 50° C. and 690 kPa (100 psig); Barrer = $10^{-10}$ $cm^3$(STP) · $cm/cm^2$ · sec · cmHg.

Example 3

Preparation of Poly(6FDA-HAB)-Block-Poly(6FDA-DBA) Block Copolyimide Hollow Fiber Membrane A hollow fiber spinning dope containing 28.2 g of poly (6FDA-HAB)-block-poly(6FDA-DBA) block copolyimide, 55 g of N-methly-2-pyrrolidone (NMP), 6.3 g of 1,3-dioxolane, and 2.2 g of isopropanol was prepared. The spinning dope was extruded at a flow rate of 3.0 mL/min through a spinneret at 50° C. spinning temperature. A bore fluid containing 25% by weight of water in NMP was injected to the bore of the fiber at a flow rate of 0.6 mL/min simultaneously with the extruding of the spinning dope. The nascent fiber traveled through an air gap length of 7 cm at room temperature with a humidity of 32%, and then was immersed into a water coagulant bath at 4° C. and wound up at a rate of 23 m/min. The water-wet fibers were annealed in a hot water bath at 85° C. for 30 minutes. The annealed water-wet fibers were then sequentially exchanged with methanol and hexane for three times and for 30 minutes each time, followed by drying at 85° C. in an oven for 1 hour to form dried poly(6FDA-HAB)-block-poly(6FDA-DBA) block copolyimide hollow fiber membrane. The dried poly (6FDA-HAB)-block-poly(6FDA-DBA) block copolyimide hollow fiber membrane was further coated with a thin layer of thermally cured RTV silicone polymer by dip-coating the hollow fibers in a 5 wt % RTV615A+B silicone solution in hexane followed by curing at 85° C. in an oven for 1 hour.

Example 4

Evaluation of $CO_2/CH_4$ Separation Performance of Poly(6FDA-HAB)-Block-Poly(6FDA-DBA) Block Copolyimide Hollow Fiber Membrane The poly(6FDA-HAB)-block-poly(6FDA-DBA) block copolyimide hollow fiber membrane prepared in Example 3 was tested for $CO_2/CH_4$ separation at 50° C. under 5617 kPa (800 psig) feed gas pressure with 10% of $CO_2$ and 90% of $CH_4$ in the feed. The poly(6FDA-HAB)-block-poly(6FDA-DBA) showed high $CO_2/CH_4$ separation performance with $CO_2$ permeance of 48 GPU and high $CO_2/CH_4$ selectivity of 38.8 for $CO_2/CH_4$ separation.

Example 5

Evaluation of $H_2/CH_4$ Separation Performance of Poly(6FDA-HAB)-Block-Poly(6FDA-DBA) Block Copolyimide Hollow Fiber Membrane The poly(6FDA-HAB)-block-poly(6FDA-DBA) block copolyimide hollow fiber membrane prepared in Example 3 was tested for $H_2/CH_4$ separation at 50° C. under 5617 kPa (800 psig) feed gas pressure with 10% of $H_2$ and 90% of $CH_4$ in the feed. The poly(6FDA-HAB)-block-poly(6FDA-DBA) showed high $H_2/CH_4$ separation performance with $H_2$ permeance of 226 GPU and high $H_2/CH_4$ selectivity of 265 for $H_2/CH_4$ separation.

SPECIFIC EMBODIMENTS

While the following is described in conjunction with specific embodiments, it will be understood that this description is intended to illustrate and not limit the scope of the preceding description and the appended claims.

A first embodiment of the invention is an aromatic block copolyimide polymer that comprises both hydroxyl functional groups and carboxylic acid functional groups wherein the aromatic block copolyimide polymer comprises multiple blocks of Ia and multiple blocks of Ib, block Ia and block Ib are covalently bound to each other, block Ia and block Ib are represented by

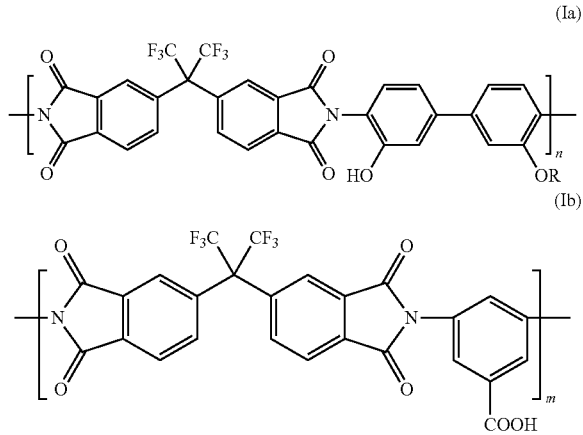

wherein the block Ia constitutes about 1-99 mol % of a total of the blocks Ia and blocks Ib; wherein —R is selected from the group consisting of —H, COCH$_3$, and mixtures thereof; and n and m are independent integers from 10 to 500. An embodiment of the invention is one, any or all of prior embodiments in this paragraph up through the first embodiment in this paragraph wherein block Ia comprises about 50-90 mol % of a total of the blocks Ia and blocks Ib. An embodiment of the invention is one, any or all of prior embodiments in this paragraph up through the first embodiment in this paragraph wherein the aromatic block copolyimide is poly[2,2'-bis-(3,4-dicarboxyphenyl) hexafluoropropane dianhydride-3,3'-dihydroxy-4,4'-diamino-biphenyl]-block-poly[2,2'-bis-(3,4-dicarboxyphenyl) hexafluoropropane dianhydride-3,5-diaminobenzoic acid].

A second embodiment of the invention is a method of preparing an aromatic block polyimide polymer comprising both hydroxyl functional groups and carboxylic acid functional groups that comprises (a) a polycondensation reaction of 2,2'-bis-(3,4-dicarboxyphenyl) hexafluoropropane dianhydride with 3,5-diaminobenzoic acid in a polar solvent at room temperature to form 2,2'-bis-(3,4-dicarboxyphenyl) hexafluoropropane dianhydride-3,5-diaminobenzoic acid-based poly(amic acid); (b) adding 3,3'-dihydroxy-4,4'-diamino-biphenyl monomer to 2,2'-bis-(3,4-dicarboxyphenyl) hexafluoropropane dianhydride-3,5-diaminobenzoic acid-based poly(amic acid) followed by the addition of 2,2'-bis-(3,4-dicarboxyphenyl) hexafluoropropane dianhydride monomer to the solution dropwise to form 2,2'-bis-(3,4-dicarboxyphenyl) hexafluoropropane dianhydride-3,5-diaminobenzoic acid-based poly(amic acid)-block-2,2'-bis-(3,4-dicarboxyphenyl) hexafluoropropane dianhydride-3,3'-dihydroxy-4,4'-diamino-biphenyl-based poly(amic acid) solution; and (c) carrying out a solution chemical imidization of 2,2'-bis-(3,4-dicarboxyphenyl) hexafluoropropane dianhydride-3,5-diaminobenzoic acid-based poly(amic acid)-block-2,2'-bis-(3,4-dicarboxyphenyl) hexafluoropropane dianhydride-3,3'-dihydroxy-4,4'-diamino-biphenyl-based poly(amic acid) in the presence of acetic anhydride dehydrating agent and pyridine imidization catalyst to form poly(2,2'-bis-(3,4-dicarboxyphenyl) hexafluoropropane dianhydride-3,5-diaminobenzoic acid)-block-poly(2,2'-bis-(3,4-dicarboxyphenyl) hexafluoropropane dianhydride-3,3'-dihydroxy-4,4'-diamino-biphenyl) block copolyimide. An embodiment of the invention is one, any or all of prior embodiments in this paragraph up through the second embodiment in this paragraph wherein the polar solvent is dimethylacetamide or N-methyl-2-pyrrolidone solvent. An embodiment of the invention is one, any or all of prior embodiments in this paragraph up through the second embodiment in this paragraph wherein the aromatic block polyimide polymer is fabricated into a membrane configuration.

A third embodiment of the invention is a process for separating at least one gas or liquids from a mixture of gases or liquids comprising providing a membrane comprising the aromatic block copolyimide polymer of this invention, causing at least one gas or liquid to permeate the membrane; and removing from an opposite side of the membrane a permeate gas or liquid composition comprising a portion of the at least one gas or liquid that permeated the membrane. An embodiment of the invention is one, any or all of prior embodiments in this paragraph up through the third embodiment in this paragraph wherein the mixture of gases are a mixture of volatile organic compounds and atmospheric gases. An embodiment of the invention is one, any or all of prior embodiments in this paragraph up through the third embodiment in this paragraph wherein the mixture of gases comprises helium, carbon dioxide or hydrogen sulfide in natural gas. An embodiment of the invention is one, any or all of prior embodiments in this paragraph up through the third embodiment in this paragraph wherein the mixture of gases comprises a mixture of hydrogen, nitrogen, methane and argon in an ammonia purge gas stream. An embodiment of the invention is one, any or all of prior embodiments in this paragraph up through the third embodiment in this paragraph wherein the mixture of gases is selected from the group consisting of nitrogen and oxygen, carbon dioxide and methane, hydrogen and methane or carbon monoxide, helium and methane. An embodiment of the invention is one, any or all of prior embodiments in this paragraph up through the third embodiment in this paragraph wherein the mixture of gases or liquids is a mixture of olefins and paraffins. An embodiment of the invention is one, any or all of prior embodiments in this paragraph up through the third embodiment in this paragraph wherein the membrane is operated at a temperature from about −50° to about 150° C. An embodiment of the invention is one, any or all of prior embodiments in this paragraph up through the third embodiment in this paragraph wherein the gas or liquids comprises a mixture of organic compounds selected from the group consisting of mixtures comprising ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid. An embodiment of the invention is one, any or all of prior embodiments in this paragraph up through the third embodiment in this paragraph wherein the mixture comprises organic compounds in water. An embodiment of the invention is one, any or all of prior embodiments in this paragraph up through the third embodiment in this paragraph wherein the mixture comprises sulfur-containing molecules in hydrocarbon streams. An embodiment of the invention is one, any or all of prior embodiments in this paragraph up through the third embodiment in this paragraph wherein the mixture comprises liquids in natural gas. An embodiment of the invention is one, any or all of prior embodiments in this paragraph up through the third embodiment in this paragraph wherein the mixture comprises carbon dioxide, oxygen, nitrogen, water vapor, hydrogen sulfide, helium, and other trace gases in natural gas.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method of preparing an aromatic block polyimide polymer comprising both hydroxyl functional groups and carboxylic acid functional groups that comprises:

(a) a polycondensation reaction of 2,2'-bis-(3,4-dicarboxyphenyl) hexafluoropropane dianhydride with 3,5-diaminobenzoic acid in a polar solvent at room temperature to form 2,2'-bis-(3,4-dicarboxyphenyl) hexafluoropropane dianhydride-3,5-diaminobenzoic acid-based poly(amic acid);

(b) adding 3,3'-dihydroxy-4,4'-diamino-biphenyl monomer to 2,2'-bis-(3,4-dicarboxyphenyl) hexafluoropropane dianhydride-3,5-diaminobenzoic acid-based poly(amic acid) followed by the addition of 2,2'-bis-(3,4-dicarboxyphenyl) hexafluoropropane dianhydride monomer to the solution dropwise to form 2,2'-bis-(3,4-dicarboxyphenyl) hexafluoropropane dianhydride-3,5-diaminobenzoic acid-based poly(amic acid)-block-2,2'-bis-(3,4-dicarboxyphenyl) hexafluoropropane dianhydride-3,3'-dihydroxy-4,4'-diamino-biphenyl-based poly(amic acid) solution; and (c) carrying out a solution chemical imidization of 2,2'-bis-(3,4-dicarboxyphenyl) hexafluoropropane dianhydride-3,5-diaminobenzoic acid-based poly(amic acid)-block-2,2'-bis-(3,4-dicarboxyphenyl) hexafluoropropane dianhydride-3,3'-dihydroxy-4,4'-diamino-biphenyl-based poly(amic acid) in the presence of acetic anhydride dehydrating agent and pyridine imidization catalyst to form poly(2,2'-bis-(3,4-dicarboxyphenyl) hexafluoropropane dianhydride-3,5-diaminobenzoic acid)-block-poly(2,2'-bis-(3,4-dicarboxyphenyl) hexafluoropropane dianhydride-3,3'-dihydroxy-4,4'-diamino-biphenyl) block copolyimide, wherein said poly(2,2'-bis-(3,4-dicarboxyphenyl) hexafluoropropane dianhydride-3,5-diaminobenzoic acid)-block-poly(2,2'-bis-(3,4-dicarboxyphenyl) hexafluoropropane dianhydride-3,3'-dihydroxy-4,4'-diamino-biphenyl) block copolyimide comprises multiple blocks of Ia and multiple blocks of Ib, block Ia and block Ib are covalently bound to each other, block Ia and block Ib are represented by:

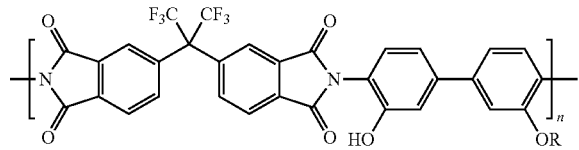

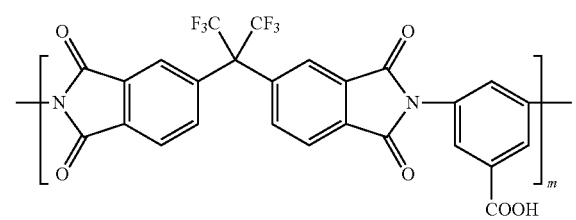

wherein said block Ia comprises about 1-99 mol % of a total of the blocks Ia and blocks Ib; wherein —R is selected from the group consisting of —H, COCH$_3$, and mixtures thereof; and n and m are independent integers from 10 to 500, wherein said poly(2,2'-bis-(3,4-dicarboxyphenyl) hexafluoropropane dianhydride-3,5-diaminobenzoic acid)-block-poly(2,2'-bis-(3,4-dicarboxyphenyl) hexafluoropropane dianhydride-3,3'-dihydroxy-4,4'-diamino-biphenyl) block copolyimide is fabricated into a membrane configuration.

2. A process for separating at least one gas or liquids from a mixture of gases or liquids comprising providing a poly(2,2'-bis-(3,4-dicarboxyphenyl) hexafluoropropane dianhydride-3,5-diaminobenzoic acid)-block-poly(2,2'-bis-(3,4-dicarboxyphenyl) hexafluoropropane dianhydride-3,3'-dihydroxy-4,4'-diamino-biphenyl) block copolyimide membrane of claim 1, causing at least one gas or liquid to permeate said membrane; and removing from an opposite side of said membrane a permeate gas or liquid composition comprising a portion of said at least one gas or liquid that permeated said membrane.

3. The process of claim 2 wherein said mixture of gases are a mixture of volatile organic compounds and atmospheric gases.

4. The process of claim 2 wherein said mixture of gases comprises helium, carbon dioxide or hydrogen sulfide in natural gas.

5. The process of claim 2 wherein said mixture of gases comprises a mixture of hydrogen, nitrogen, methane and argon in an ammonia purge gas stream.

6. The process of claim 2 wherein said mixture of gases is selected from the group consisting of nitrogen and oxygen, carbon dioxide and methane, hydrogen and methane or carbon monoxide, helium and methane.

7. The process of claim 2 wherein said mixture of gases or liquids is a mixture of olefins and paraffins.

8. The process of claim 2 wherein said membrane is operated at a temperature from about −50° to about 150° C.

9. The process of claim 2 wherein said gas or liquids comprises a mixture of organic compounds selected from the group consisting of mixtures comprising ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

10. The process of claim 2 wherein said mixture comprises organic compounds in water.

11. The process of claim 2 wherein said mixture comprises sulfur-containing molecules in hydrocarbon streams.

12. The process of claim 2 wherein said mixture comprises liquids in natural gas.

13. The process of claim 2 wherein said mixture comprises carbon dioxide, oxygen, nitrogen, water vapor, hydrogen sulfide, helium, and other trace gases in natural gas.

* * * * *